(12) United States Patent
Takata et al.

(10) Patent No.: US 7,415,420 B2
(45) Date of Patent: Aug. 19, 2008

(54) CUSTOMER SUPPORT SYSTEM, AN OFFICE SYSTEM, A CUSTOMER SUPPORT CENTER, A SUPPLY CENTER AND A CUSTOMER SUPPORT METHOD

(75) Inventors: Hisashi Takata, Tokyo (JP); Yasuhiko Hosoe, Tokyo (JP); Yoshiaki Yokoyama, Tokyo (JP); Takahisa Yano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 989 days.

(21) Appl. No.: 10/107,327

(22) Filed: Mar. 28, 2002

(65) Prior Publication Data
US 2002/0143593 A1    Oct. 3, 2002

(30) Foreign Application Priority Data
Mar. 30, 2001    (JP)    ............... 2001-101933

(51) Int. Cl.
*G06F 17/50*    (2006.01)
(52) U.S. Cl. .......................................... 705/7
(58) Field of Classification Search ................. 705/7–8, 705/28
See application file for complete search history.

(56) References Cited

U.S. PATENT DOCUMENTS

| | | | |
|---|---|---|---|
| 5,673,190 A * | 9/1997 | Kahleck et al. ............... | 700/2 |
| 5,678,002 A * | 10/1997 | Fawcett et al. ............... | 715/709 |
| 5,887,216 A * | 3/1999 | Motoyama ..................... | 399/8 |
| 5,983,202 A * | 11/1999 | Yabe et al. ..................... | 705/28 |
| 6,202,210 B1 * | 3/2001 | Ludtke .......................... | 725/20 |
| 6,601,190 B1 * | 7/2003 | Meyer et al. ................... | 714/37 |
| 7,089,322 B1 * | 8/2006 | Stallmann ..................... | 709/238 |
| 2001/0018691 A1 * | 8/2001 | Sakakibara et al. ......... | 707/104.1 |
| 2001/0027470 A1 * | 10/2001 | Ulmer et al. ................. | 709/203 |
| 2002/0111950 A1 * | 8/2002 | Lee ............................... | 707/100 |

FOREIGN PATENT DOCUMENTS

| | | |
|---|---|---|
| JP | 8-187921 | 7/1996 |
| JP | 10-034122 | 2/1998 |
| JP | 11352846 A | 12/1999 |
| JP | 2000-29354 | 1/2000 |
| JP | 2000-194767 | 7/2000 |

OTHER PUBLICATIONS

Gotcher "HP FirstView delivers insight into hard-copy costs", Aug. 1998, Info World v20n35 pp. 91, Dialog file 15, Accession No. 01691887.*
Office Action directed at corresponding Japanese Application No. 2003-353575 issued on Aug. 21, 2007.

* cited by examiner

*Primary Examiner*—Romain Jeanty
(74) *Attorney, Agent, or Firm*—Morrison & Foerster LLP

(57) ABSTRACT

Resupply, recycling and exchange of consumption items of office apparatuses made by two or more manufacturers can be facilitated by a customer support center, a supply center, office systems and customer support terminals connected via a communication network, wherein an apparatus management database, a cost and supply information database, an analysis database, and a supply management database are installed at appropriate locations, each associated with functional units such as a data acquisition unit, a data analysis unit, a report generating unit and the like for issuing purchase orders, recycling orders, exchange orders and office system improvement proposals.

8 Claims, 4 Drawing Sheets

CUSTOMER SUPPORT SYSTEM, AN OFFICE SYSTEM, A CUSTOMER SUPPORT CENTER, A SUPPLY CENTER AND A CUSTOMER SUPPORT METHOD

BACKGROUND OF THE INVENTION

1. Field of the Invention

The present invention relates to a customer support system, an office system, a customer support center, a supply center and a customer support method.

2. Description of the Related Art

In conventional information centers of office systems and the like, usage information relative to office apparatuses is stored for each manufacturer of the apparatuses. However, there are no systems that offer management of office apparatuses of a plurality of manufacturers in a comprehensive manner.

Further, office users have to take care of resupplying consumption items of the office apparatuses, and each manufacturer looks after recycling of used materials only of the manufacturer.

The problem to be solved is in that a conventional office system does not offer management of office apparatuses of a plurality of manufacturers, although an office usually uses office apparatuses of different makers. That is, the office system management is not optimized.

Further, ordering and recycling of consumption items have to be arranged per manufacturer, causing office management of consumption items to be a time-consuming problem.

The present invention is made in view of the above-mentioned problems, providing a more desirable office system that looks after various office apparatuses of a plurality of manufacturers, and simplifying the resupplying of consumption items, and the like.

SUMMARY OF THE INVENTION

It is a general object of the present invention to provide a customer support system, an office system, a customer support center, a supply center and a customer support method that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the customer support system, the office system, the customer support center, the supply center and the customer support method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a customer support system, an office system, a customer support center, a supply center and a customer support method that enable, among other things, easy management of ordering and recycling consumption items of office apparatuses made by a plurality of manufacturers.

More specifically, the customer support system includes the customer support center that supports a customer, based on apparatus management information of apparatuses installed at a premises of the customer, one or more office systems, a communication network, and one or more customer support terminals connected to one of the customer support center and the communication network.

Each of the office systems includes a plurality of office apparatuses manufactured by a plurality of manufacturers, an apparatus management information database that stores apparatus management information for managing the plurality of the office apparatuses, and a data acquisition and distribution unit that acquires usage information of the office apparatuses and stores the usage information in the apparatus management information database.

Further, the customer support center includes a data collection unit that collects the apparatus management information stored in the apparatus management information database, and a data analysis unit that analyzes the apparatus management information of each office system individually, wherein the data analysis unit outputs analysis results about the office system concerned for supporting the customer according to a request from a customer support terminal and the office system.

In this manner, the customer support center acquires and analyzes the apparatus management information of the office apparatuses made by a plurality of manufacturers. Accordingly, a proposal for an improved office system can be presented, considering the entire office system.

A supply management unit is provided in the customer support center such that an automated purchase requisition of consumption items can be issued, when a resupply is needed, simplifying a requisition process and the like.

Each of the office systems includes an apparatus management information database for storing apparatus management information, and a data acquisition and distribution unit for acquiring and storing usage information of the office apparatuses. The apparatus management information is transmitted to the customer support center upon request and at a predetermined time from the data acquisition and distribution unit, enabling the customer support center to analyze the entire office system that includes office apparatuses of a plurality of manufacturers.

The office system includes a cost and supply information database for storing cost information and supply information relative to the office apparatuses. The cost information and the supply information are transmitted to the customer support center upon request from the customer support center and at a predetermined time, enabling the customer support center to analyze costs and supply conditions of consumption items made by the plurality of the manufacturers in a uniform manner.

The predetermined time mentioned above may be any time of a day, a week, a month and a year, and when an office system is introduced and when an office apparatus is added and changed, ensuring an efficient data transmission from the office system to the customer support center.

The cost information and the supply information includes a date of the last resupply, a quantity resupplied, a standard consumption amount per use and a unit price of the consumption items of each of the office apparatuses, enabling office managers to grasp costs, timing for resupplying, and the like.

The apparatus management information includes information indicating the number of office apparatuses installed, model names, users, usage, maintenance records and latency time, enabling the customer support center to perform a detailed analysis of usage on an office system basis and on an individual basis.

The customer support center includes a data acquisition unit for acquiring the apparatus management information relative to the office apparatuses made by the plurality of the manufacturers, and the cost information and supply information thereof, an analysis database for storing the above information for each of the office systems, and a data analysis unit for analyzing the information and outputting analysis results thereof. In this manner, a proposal for a better office system can be prepared, taking the entire office system that includes office apparatuses made by different manufacturers into consideration.

The customer support center further includes a report generating unit for generating a report, based on the results outputted by the data analysis unit, enabling the customer supporter to submit various improvement proposals.

In this manner, the customer support center can propose an office system that offers less latency time and reduced costs, using the information stored in the analysis database of each of the office systems. In this manner, an office system improvement proposal can be prepared.

The data analysis unit generates information about peak usage, amount of usage per organizational unit, amount of usage per individual and costs associated with an office apparatus and consumption items therefor in a graphical chart, facilitating the ability of the customer to grasp points to be improved.

Analysis by the data analysis unit is a continuous job, with a crosschecking of past analysis results performed such that precision of analysis attained provides support satisfactory to the customer.

The customer support center includes a supply management database for storing management information of consumption items of the office apparatuses, and a supply management unit for managing the consumption items of each of the office systems, realizing appropriate management of the consumption items.

The supply management unit automatically places a purchase order for a consumption item when the amount on hand of the consumption item becomes lower than a predetermined amount, based on information stored in the analysis database and the supply management database, which saves manual processing for consumption item resupply.

The customer support center issues a recycling order at a predetermined time, and when a purchase order is placed for a consumption item that should not be discarded but should be recycled, which saves manual processing for recycling.

Information indicating an amount on hand of a consumption item is included in the cost information and the supply information stored in the analysis database, which is updated based on actual usage. In this manner, estimated timing for resupply can be indicated with precision.

The supply center of the present invention includes a supply management database, a supply request receiving unit and a supply directing unit such that the supply center can process resupply, recycling and exchange of consumption items of the office apparatuses.

The supply center includes a screen generating unit that generates a computer screen for receiving requests for resupply, recycling and exchange of consumption items, which can be performed on the screen. In this manner, processing of resupply, recycling, and exchange is facilitated.

The screen mentioned above displays, among other things, costs and delivery periods relative to the resupply, recycling and exchange such that the processing can be performed in consideration of the costs and the delivery periods.

The present invention includes a customer support method using the customer support center, the communication network and the customer support terminals, each including appropriate apparatuses, databases and units as described above. Thereby, a more desirable office system can be proposed, and the resupply, recycling and exchange of consumption items required by office apparatuses made by different manufacturers are automated and facilitated.

DESCRIPTION OF THE PREFERRED EMBODIMENTS

In the following, embodiments of the present invention will be described with reference to the accompanying drawings.

Figure 1:
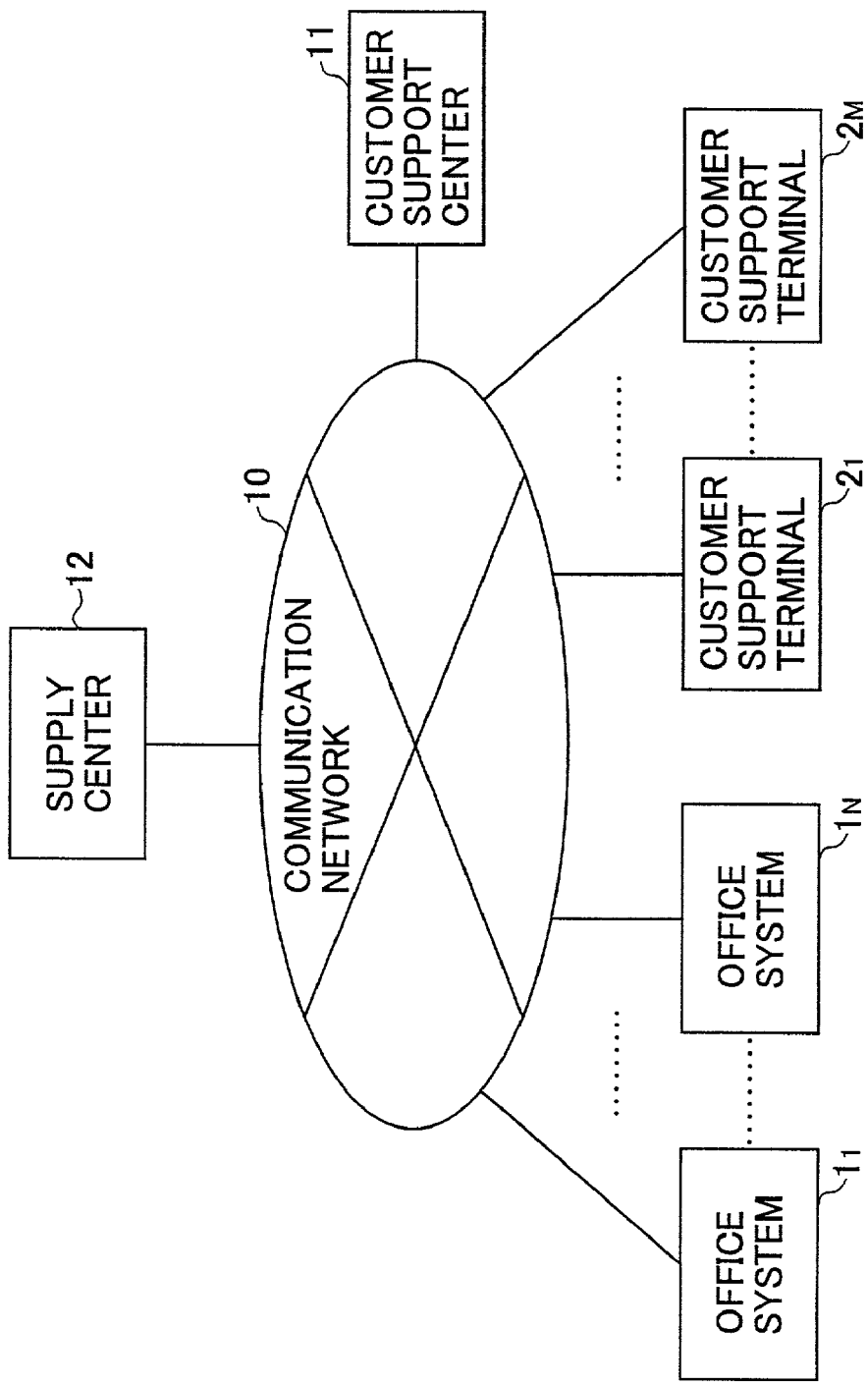
FIG. 1 a figure for explaining an example of a customer support system of the present invention

An example of a customer support system of the present invention is shown in FIG. 1.

The customer support system of FIG. 1 includes office systems $1_1$-$1_N$, customer support terminals $2_1$-$2_M$, a communication network 10, a customer support center 11, and a supply center 12.

The communication network 10 is any communication network, such as the Internet.

The office systems $1_1$-$1_N$ include office apparatuses, such as a personal computer, a printer, a copying machine, and a facsimile apparatus. These apparatuses are made by a plurality of manufacturers. Customer support terminals $2_1$-$2_M$ are terminals attended by those who support customers, such as a service person. Here, the customer support terminals $2_1$-$2_M$ may be directly connected to the customer support center 11.

The customer support center 11 collects and analyzes usage information, cost and supply information, and the like of the office systems $1_1$-$1_N$, and supports customers in regard to an improvement proposal for the office system, a resupply and recycling of consumption items, and the like. The office systems $1_1$-$1_N$ may be directly connected to the customer support center 11 using a leased line and the like.

The supply center 12 performs resupply, recycling and exchange of different manufacturers' consumption items (for example, a toner cartridge). The supply center 12 may be established as a third party organization that is jointly operated and used by a plurality of manufacturers. The supply center 12 may perform resupply and recycling of consumption items based on requests. The supply center 12 may further recycle the consumption items, and may exchange used consumption items for recycled consumption items.

Since the supply center 12 can perform resupply, recycling, and exchange of different manufacturers' consumption items, a significant advantage can be offered if the consumption items are ones that should not be discarded, but should be recycled. However, the supply center 12 may also be used for consumption items that do not require recycling, such as paper.

Although details will be mentioned later, the office systems $1_1$-$1_N$ have office apparatuses made by different manufacturers, collect usage information on the office apparatuses, and store the usage information in an apparatus management information database that includes the usage information. The customer support center 11 collects the apparatus management information of the office systems, analyzes the information, submits improvement proposals and the like for the office systems, based on the analysis, and supports customers.

Moreover, the customer support center 11 manages the consumption items of an office system, and places an order for consumption items etc. on behalf of the customers.

Figure 2:
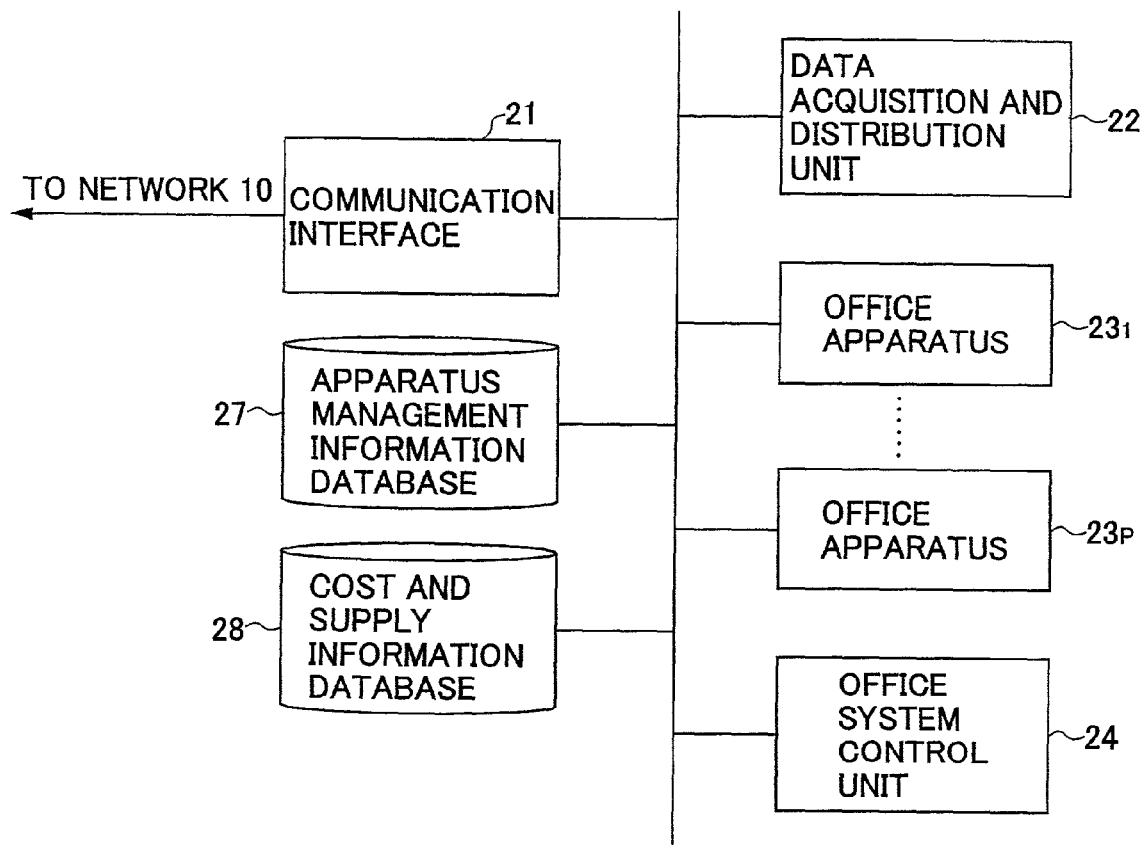
FIG. 2 is a figure for explaining an example of office systems $1_1$-$1_N$.

An example of the office systems $1_1$-$1_N$ is shown in FIG. 2, which includes a communication interface 21, a data acquisition and distribution unit 22, office apparatuses $23_1$-$23_P$, an office system control unit 24, an apparatus management information database 27, and a cost and supply information database 28.

The communication interface 21 interfaces the office system concerned with the network 10. Thereby, two-way communication becomes possible between the office system concerned and the customer support center 11, and the like.

The data acquisition and distribution unit 22 collects usage information of the office apparatuses $23_1$-$23_P$. The usage information includes a usage amount of the office apparatuses $23_1$-$23_P$ (for example, usage amount of a copying machine expressed in terms of the usage amount of paper according to sizes, the usage amount according to feed stages, and the usage amount of both-side copying, the amounts being counted for each individual and each group), latency time (for example, latency time to print data of a personal computer by a printing server), consumption information of consumption items (for example, paper and toner), resupply information on the consumption items, and trouble/maintenance information (for example, paper jamming). The collected usage information is stored in the apparatus management information database 27 without delay. The office apparatuses $23_1$-$23_P$ include a personal computer, a printer, a copying machine, and a facsimile apparatus, and all data concerning use of the apparatuses is transmitted to the data acquisition and distribution unit 22.

The office-system control unit 24 controls the entire office system. The apparatus management information database 27 stores the apparatus management information that includes the office apparatus usage information and the office apparatus management information collected by the data acquisition and distribution unit 22. The office apparatus management information includes information about the number of apparatuses installed, model names of the apparatuses (for example, classification, such as a personal computer, a printer, a copying machine, and a facsimile apparatus), ID numbers of the apparatuses (for example, a network number of IPv6, a manufacturer name, a serial number), user information (an individual name, a group name) and so on. Here, the apparatus management information database 27 may be a part of the data acquisition and distribution unit 22.

The data acquisition and distribution unit 22 transmits the apparatus management information stored in the apparatus management information database 27 to the customer support center 11 at a predetermined time, and when the customer support center 11 requests. Here, the predetermined time may be any time of a day, a week, a month, and a year, and when an office system is introduced, and when an apparatus is added and changed, and the like. The request from the customer support center 11 may be performed by sending a signal such as a request-to-send signal, a polling signal, a selecting signal and the like.

The cost and supply information database 28 stores information that indicates a date and time of a previous resupply of the consumption items and an amount of the resupply, and defines a standard amount of a consumption item per use, and a unit price of the consumption items. Other than the information about the standard amount of a consumption item per use, information indicating an ordering cycle may be used.

Next, an example of the ordering cycle of the consumption items of a copying machine that is capable of copying 65 sheets a minute is shown.
Toner: One box/four months
Developer: One box/30 months
Photo detector: One/nine months The cost and supply information database 28 may be a part of the apparatus management information databases 27.

The data acquisition and distribution unit 22 transmits the cost information and the supply information stored in the cost and supply information database 28 to the customer support center 11 at a predetermined time and when the customer information center 11 requests.

Based on the information, the customer support center 11 can grasp costs of a system, and can perform a resupply of consumption items, etc.

Figure 3:
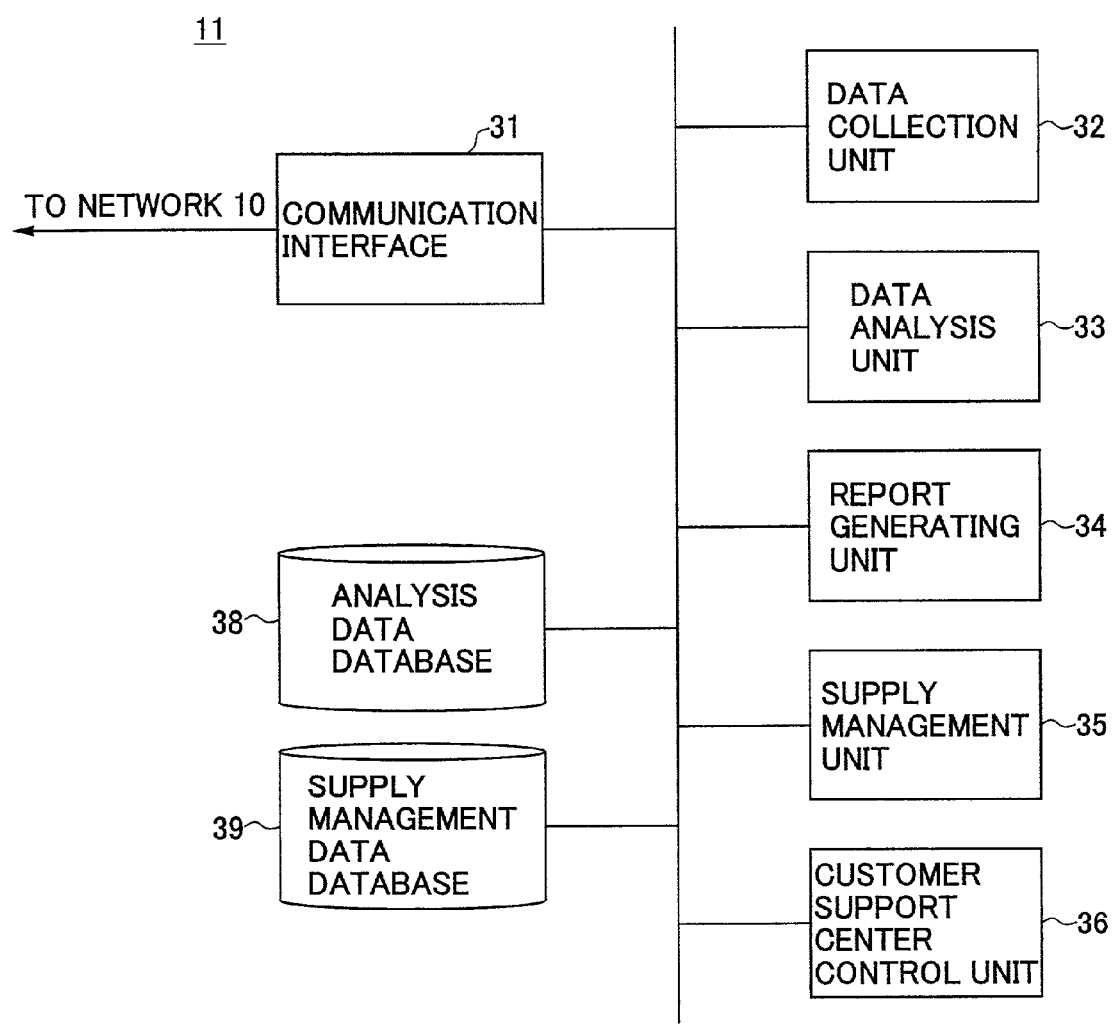
FIG. 3 is a figure for explaining an example of a customer support center of the present invention.

An example of the customer support center 11 of the present invention is shown in FIG. 3.

The customer support center 11 of FIG. 3 includes a communication interface unit 31, a data collection unit 32, a data analysis unit 33, a report generating unit 34, a supply management unit 35, a customer support center control unit 36, an analysis database 38, and a supply management database 39.

The communication interface unit 31 interfaces the customer support center 11 with the network 10. Thereby, two-way communication becomes possible between the office systems $1_1$-$1_N$ and the customer support center 11, etc.

The data collection unit 32 collects apparatus management information, and cost information and supply information of apparatuses of a plurality of the office systems. Specifically, the data collection unit 32 receives and collects the information from the office systems at a predetermined time and by transmitting a request-to-send signal, a polling signal and a selecting signal. In collecting the apparatus management information of an office apparatus etc., the data collection unit 32 acquires the information from one of the data acquisition and distribution unit 22, the apparatus management information database 27, and the cost and supply information database 28 of an office system.

The collected apparatus management information and the like are stored in one or both of the analysis database 38 and the supply management database 39.

The data analysis unit 33 analyzes an office system with reference to the apparatus management information stored in the analysis database 38 and the supply management database 39.

For example, the data analysis unit 33 processes and generates graphs of the apparatus management information that include peak usage of an apparatus, usage statistics per organizational unit, usage statistics per individual and cost information of an apparatus.

The data analysis unit 33 further generates a proposal of a system that reduces latency time and costs, a simulation if outsourcing is employed, a proposal for improving usage of consumption items, a proposal of an optimum allocation of apparatuses, a proposal of a new service, and the like.

The customer support center 11 may carry out the analysis at a predetermined time. Alternatively, the analysis may be performed upon request from a customer support terminal and an office system. Further, the data analysis unit 33 analyzes continuously and checks past analysis results.

The supply management unit 35 manages consumption items, using the information stored in the supply management database 39 for every office system. The supply management unit 35 estimates the amount on hand of each of the consumption items, based on the information stored in the analysis database 38, and the information stored in the supply management database 39. An automated order placement may be arranged, when the on hand amount becomes less than a predetermined value.

The supply management unit 35 can be structured such that an order for recycling a consumption item that should not be discarded but should be recycled is automatically issued when a purchase order is issued and when the on hand amount of such consumption items to be recycled reaches a predetermined amount.

Alternatively, the supply management unit 35 can automatically issue a requisition for resupply, recycling and exchange of consumption items to the supply center 12 that is connected to the communication network 10, for consumption items that should not be discarded, but should be recycled.

The customer support center control unit 36 controls the entire customer support center. The report generating unit 34 outputs results of analysis performed by the data analysis unit 33 in a report form. Reports include a usage report of the office system of a customer, a report of a system configuration that reduces time and costs, a simulation report when outsourcing is employed, an improvement proposal report concerning use of consumption items, and the like.

The analysis database 38 stores the information that the data analysis unit 33 requires, the information including the apparatus management information and the cost information of an office system. Here, information indicating an on hand amount of consumption items in the cost information and the supply information stored in the analysis database 28 is updated, based on actual use of the office system concerned.

The supply management database 39 stores the information that the supply management unit 35 uses, wherein the supply information of the office system is stored.

Figure 4:
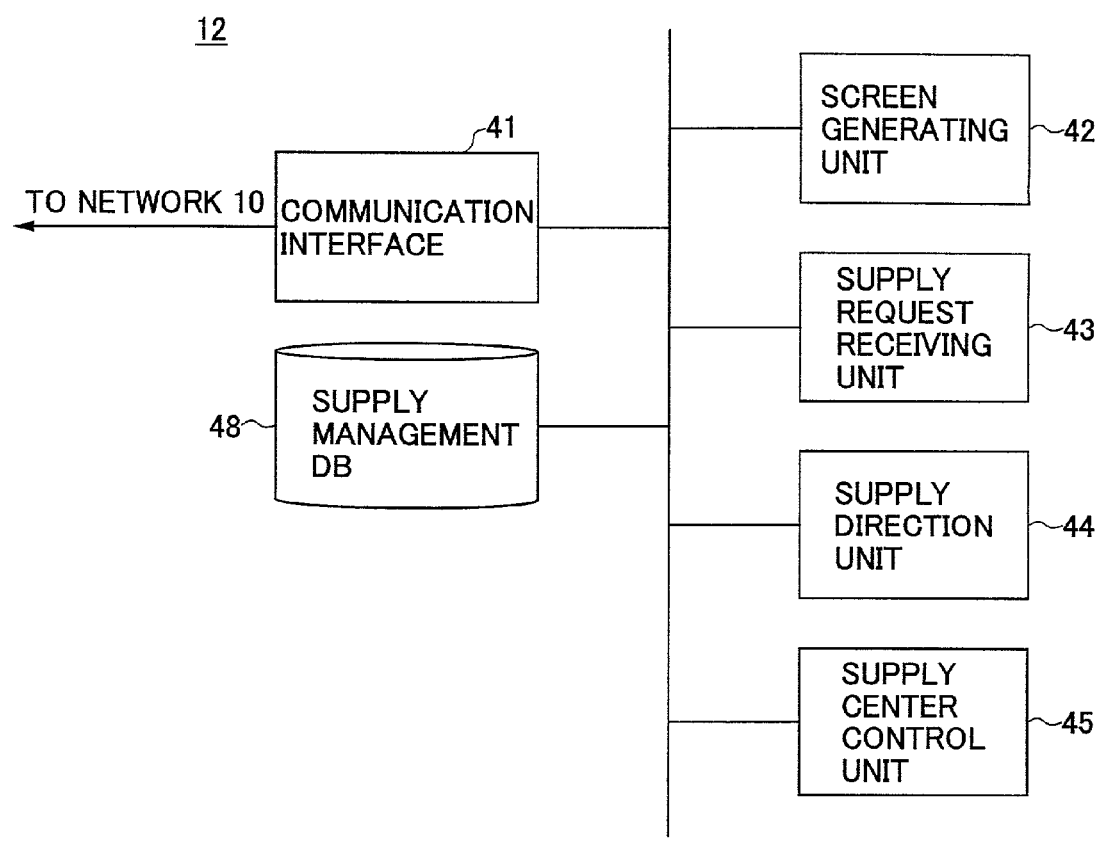
FIG. 4 is a figure for explaining an example of a supply center of the present invention.

FIG. 4 shows an example of the supply center 12 of the present invention for consumption items that should not be discarded, but should be recycled, wherein the supply center 12 performs resupply, recycling and exchange of the consumption items.

The supply center of FIG. 4 includes a communication interface unit 41, a screen generating unit 42, a supply request receiving unit 43, a supply direction unit 44, a supply center control unit 45, and a supply management database 48. The communication interface unit 41 interfaces the supply center 12 with the network 10. Thereby, two-way communication becomes possible between the supply center 12 and the customer support center 11, etc.

The screen generating unit 42 generates screens, such as a web page when the supply center 12 has its own web site on the Internet. Here, the screen generating unit 42 is unnecessary when a third person's web site is used. Although not illustrated, the screen generating unit 42 generates a login screen, an admission/registration screen, a supply request receiving screen, a reference screen, a check screen, and the like. On the supply request receiving screen, costs and delivery periods relative to resupply, recycling and exchange of consumption items are displayed.

The supply request receiving unit 43 receives a request for resupply, recycling, and exchange of the consumption items. Specifically, the inputted resupply request is received and displayed on the supply request receiving screen. The supply direction unit 44 directs resupply, recycling and exchange of the consumption items based on the request for resupply, recycling, and exchange of the consumption items, which the supply request receiving unit received.

The supply center control unit 45 controls the entire supply center. The supply management database 48 stores information for management of consumption items. The stored information includes basic data for calculation of costs and delivery periods required for resupply, recycling and exchange of consumption items.

Based on a request, the supply center 12 performs resupply and recycling of consumption items, may recycle the consumption items, and may exchange a used consumption item for a recycled consumption item.

Using the supply center 12 relative to consumption items, customers and the like can simplify a resupply and recycling of consumption items. Thereby, total management of supply is achieved and the customers can attain an increase in business efficiency.

Although a significant advantage can be realized if the supply center 12 is used relative to consumption items that should not be discarded, but should be recycled, the supply center 12 can also be used for consumption items that do not require recycling, such as paper.

As described in above, the present invention considers the entire office system including office apparatuses of a plurality of manufacturers, and realizes a more desirable office system, simplifying processes for resupply and the like of consumption items.

Further, the present invention is not limited to these embodiments, but various variations and modifications may be made without departing from the scope of the present invention.

The present application is based on Japanese priority application No. 2001-101933 filed on Mar. 30, 2001, with the Japanese Patent Office, the entire contents of which are hereby incorporated by reference.

What is claimed is:

1. A customer support center that supports a customer, based on apparatus management information of office apparatuses manufactured by a plurality of manufacturers, and installed at a premises of the customer, comprising:

a data collection unit coupled to a plurality of office systems through a network and configured to collect through the network the apparatus management information, cost information, and supply information on the office apparatuses of a plurality of office systems, each of which includes one or more office apparatuses, at least one of the office systems including two or more office apparatuses, an analysis database that stores the apparatus management information, the cost information, and the supply information separately for each of the office systems, and a data analysis unit that analyzes the information stored in the analysis database separately for each of the office systems wherein the data analysis unit generates information relative to a peak usage of each of the office apparatuses, usage statistics per organizational unit, usage statistics per individual, and costs associated with the office apparatuses and associated materials, using the information stored in the analysis database, and further prepares graphical representations for each of the office systems.

2. The customer support center as claimed in claim 1, comprising a report generating unit that generates a report to the customer and the customer supporters, wherein the report generating unit generates the report based on data that the data analysis unit analyzes.

3. The customer support center as claimed in claim 1, wherein the data analysis unit proposes a system for each of the office systems, which reduces latency time and costs associated with the office apparatuses, using the information stored in the analysis database.

4. The customer support center as claimed in claim 1, wherein the data analysis unit continuously analyzes the information stored in the analysis database, and verifies past analysis results.

5. The customer support center as claimed in claim 1, further comprising: a supply management database that stores information for managing consumption items of the office apparatuses, and a supply management unit that manages the consumption items for each of the office systems.

6. The customer support center as claimed in claim 5, wherein the supply management unit estimates a balance on hand of each of the consumption items, based on the information stored in the analysis database and the information stored in the supply management database, and automatically places a purchase order for a consumption item when an amount of the balance on hand becomes less than a predetermined amount.

7. The customer support center as claimed in claim 6, wherein the supply management unit automatically directs a recycling of a consumption item discarding of that is prohibited, at a predetermined time and when a purchase order of the consumption item is placed.

8. The customer support center as claimed in claim 1, wherein information indicating consumed amount of a consumption item in the cost information and the supply information stored in the analysis database is updated, based on actual usage for each of the office systems.

* * * * *